United States Patent
Zhang et al.

(10) Patent No.: US 10,851,247 B2
(45) Date of Patent: *Dec. 1, 2020

(54) HIGH PURITY DISORBATE ESTER OF TRIETHYLENE GLYCOL

(71) Applicants: Rohm and Haas Company, Collegeville, PA (US); Dow Global Technologies LLC, Midland, MI (US)

(72) Inventors: Jiguang Zhang, Shanghai (CN); Bo Lv, Shanghai (CN); Selvanathan Arumugam, Blue Bell, PA (US); John Ell, Midland, MI (US); Nicole Hewlett, Midland, MI (US); John W. Hull, Jr., Midland, MI (US); Wei Wang, Chester Springs, PA (US); Brandon Rowe, Robbinsville, NJ (US)

(73) Assignees: Dow Global Technologies LLC, Midland, MI (US); Rohm and Haas Company, Collegeville, PA (US)

(*) Notice: Subject to any disclaimer, the term of this patent is extended or adjusted under 35 U.S.C. 154(b) by 197 days.

This patent is subject to a terminal disclaimer.

(21) Appl. No.: 16/076,480

(22) PCT Filed: Feb. 19, 2016

(86) PCT No.: PCT/CN2016/074109
§ 371 (c)(1),
(2) Date: Aug. 8, 2018

(87) PCT Pub. No.: WO2017/139965
PCT Pub. Date: Aug. 24, 2017

(65) Prior Publication Data
US 2019/0085169 A1 Mar. 21, 2019

(51) Int. Cl.
*C09D 4/00* (2006.01)
*C08K 5/103* (2006.01)
*C08K 5/11* (2006.01)

(52) U.S. Cl.
CPC ............... *C09D 4/00* (2013.01); *C08K 5/103* (2013.01); *C08K 5/11* (2013.01)

(58) Field of Classification Search
CPC ............ C09D 4/00; C08K 5/103; C08K 5/11
See application file for complete search history.

(56) References Cited

U.S. PATENT DOCUMENTS

| | | | |
|---|---|---|---|
| 9,714,359 B2 * | 7/2017 | Arumugam | C09D 133/06 |
| 2010/0216915 A1 | 8/2010 | Bloom | |
| 2011/0269979 A1 * | 11/2011 | Benecke | C07C 67/39 554/69 |
| 2012/0172609 A1 * | 7/2012 | Bredsguard | B05B 1/326 554/122 |
| 2015/0361290 A1 | 12/2015 | Arumugam et al. | |
| 2016/0152856 A1 * | 6/2016 | Arturo | C09D 147/00 427/385.5 |
| 2016/0272825 A1 * | 9/2016 | Arturo | C09D 5/00 |
| 2016/0304718 A1 * | 10/2016 | Bindschedler | C09J 193/04 |
| 2017/0037266 A1 * | 2/2017 | Arturo | C09D 7/63 |

FOREIGN PATENT DOCUMENTS

| | | |
|---|---|---|
| JP | 1056602 | 3/1989 |
| JP | 2001181348 | 7/2001 |
| WO | 2017139965 | 8/2017 |

OTHER PUBLICATIONS

Lu jinliang, Cai hanxing, li hong, Lu wei, Liao aiping, Song jianping. Jiangxihuagong, 2007, 7, 53-54.
Huang, Zhiliang et al.; Journal of South China Agricultural University, 2002, 23 (3), 84-86.
Wang, Jiangang et al.; Huaxueshiji, 2010, 32(7), 657-660.
Narasimhan et al. Bioorganic & Medicinal Chemistry Letters 17 (2007) 5836-5845.

* cited by examiner

*Primary Examiner* — Jun Li
(74) *Attorney, Agent, or Firm* — Reid S. Willis

(57) ABSTRACT

The present invention relates to a composition comprising triethylene glycol disorbate and triethylene glycol monosorbate, at a disorbate to monosorbate weight-to-weight ratio of from 19:1 to 99:1. The composition of the present invention is useful as a low VOC coalescent in coatings formulations.

10 Claims, No Drawings

HIGH PURITY DISORBATE ESTER OF TRIETHYLENE GLYCOL

The present invention relates to a high purity (>95%) disorbate ester of triethylene glycol and its preparation. The disorbate ester is useful as a coalescent in coatings formulations.

Recent environmental regulations around the globe are driving the need in the architectural coatings market for materials with very low or no odor and low volatile organic chemicals (VOCs). Balancing VOCs against desired paint performance attributes is a continuing challenge.

Paint formulations comprise either a low $T_g$ polymer latex that forms film with little or no coalescent, or a high $T_g$ latex that forms film with the aid of a coalescent. Formulations containing low $T_g$ polymers generally give coatings having a soft and tacky feel and poor durability. Formulations using high-$T_g$ polymers, on the other hand, require either permanent (nonvolatile) coalescents or volatile coalescents; permanent coalescents are known to adversely affect the hardness performance of the consequent coating; volatile coalescents such as Texanol, on the other hand, may give acceptable hardness performance—for example, a König hardness of ~20 s at 28 days for a typical semigloss paint—but are undesirable for their volatility.

Both low temperature film formation and film hardness can be achieved by using a reactive coalescent. For example, WO 2007/094922 describes the use of a bis-allylic unsaturated fatty acid ester as a reactive coalescent. Unfortunately, the described coalescent does not yield the desired hardness performance properties for the consequent coating.

A particularly attractive class of coalescents is the disorbate ester, especially for its low volatility. Unfortunately, current methods used to prepare disorbate esters result in unacceptably high levels of the relatively volatile monosorbate; efforts to push the reaction to produce higher yields of the desired disorbate result in the formation of substantial amounts of undesirable polymeric byproducts. It would therefore be an advantage in the art of low VOC coalescents to discover a way to prepare a high purity disorbate ester.

SUMMARY OF THE INVENTION

The present invention addresses a need in the art by providing, in a first aspect, a composition comprising triethylene glycol disorbate and triethylene glycol monosorbate, wherein the weight:weight ratio of the disorbate to the monosorbate is from 19:1 to 99:1.

In a second aspect, the present invention is a method comprising the steps of contacting triethylene glycol with sorbic acid in the presence of a sulfuric acid catalyst and in an aprotic solvent that forms an azeotrope with water, at a temperature in the range of from 90° C. to 160° C. to produce a mixture of triethylene glycol disorbate and triethylene glycol monosorbate at a weight-to-weight ratio in the range of 19:1 to 99:1.

The high purity triethylene glycol disorbate and a small amount of the corresponding monosorbate provides a mixture that would meet low VOC requirements while being sufficiently impure to provide a non-crystalline material that would be suitable as a coalescent.

DETAILED DESCRIPTION OF THE INVENTION

In a first aspect, the present invention is a composition comprising triethylene glycol disorbate and triethylene glycol monosorbate, at a disorbate to monosorbate weight-to-weight ratio of from 19:1 to 99:1. This relatively high purity material is advantageously prepared by contacting triethylene glycol with sorbic acid together in the presence of a catalytic amount of sulfuric acid and in an aprotic solvent that forms an azeotrope with water.

The structures of triethylene glycol disorbate and triethylene glycol monosorbate are as follows:

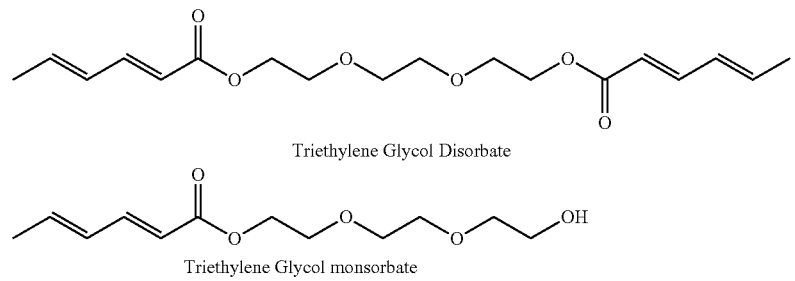

Triethylene Glycol Disorbate

Triethylene Glycol monsorbate

The reaction is carried at an internal temperature (i.e., the temperature of the contents of the reactor) in the range of from 80° C., preferably from 100° C., and more preferably from 110° C., to 160° C., preferably to 150° C., and more preferably to 140° C. The solvent is preferably immiscible with water and more preferably has a density less than that of water. Examples of suitable solvents include toluene, xylene, chlorobenzene, ethyl benzene, and dibutyl ether, with toluene and xylene being preferred.

The amount of solvent used in the reaction is generally in the range of from 0.25, more preferably from 0.5, and most preferably from 0.75 times, to 4, more preferably to 2, and most preferably to 1.25 times the weight of sorbic acid and triethylene glycol used.

The concentration of sulfuric acid used to promote the reaction is typically in the range of from 0.1, preferably from 0.5, more preferably from 1, and most preferably from 2 weight percent, to 4, and preferably to 3 weight percent, based on the weight of sorbic acid. It was found to be advantageous to dilute sulfuric acid in a solvent to reduce the formation of undesirable color bodies in the final product. A preferred w/w ratio of solvent to sulfuric acid is in the range of from 5:1 to 20:1.

The mole-to-mole ratio of sorbic acid to triethylene glycol is preferably from 4:1, more preferably from 3:1, more preferably from 2.5:1, and most preferably from 2.2:1, to 2.0:1.

The reaction also advantageously includes from about 50 to 5000 ppm of a free radical inhibitor such as dibutylhydroxytoluene (BHT), (2,2,6,6-tetramethylpiperidinyl-1-yl) oxyl (TEMPO), 4-hydroxy-TEMPO, hydroquinone, p-methoxyhydroquinone, t-butyl-p-hydroquinone, t-butyl-4-hydroxyanisoles, and 4-t-butyl catechol.

The preference for a solvent that is high boiling, aprotic, water-immiscible, and less dense than water arises from the desirability to remove water that is formed during the course of the reaction and recycling back solvent. An apparatus particularly suitable for this purpose is a Dean-Stark trap.

In an especially preferred method of preparing the high purity disorbate, sorbic acid and triethylene glycol (at about a 2.2:1 mole-to-mole ratio) are placed a flask equipped with a Dean-Stark trap. The contents of the flask are stirred and heated sufficiently to dissolve the acid, whereupon a mixture of sulfuric acid in toluene (about a 1:1 weight ratio of toluene to reactants) is added slowly to the flask. A free radical inhibitor is then added, after which time the temperature of the mixture was raised to 120° C. to 130° C. The reaction proceeds until the condensation of water in the Dean-Stark trap proceeds to substantial completion, typically from about 1 to 10 hours. The weight-to-weight ratio of the disorbate ester to the monosorbate ester is from 95:5 (19:1), preferably from 96:4 (24:1), more preferably from 97:3 (32:1), and most preferably from 97.5:2.5 (39:1), to 99:1, more preferably to 98.5:1.5 (65.7:1).

In addition to providing a product with a relatively low amount of the monosorbate, the composition of the present invention also contains a substantial absence of gelled byproducts having a molecular weight of >5000 Daltons. Gelation can and does occur when attempts are made to push the reaction to the disorbate to completion under improper reaction conditions. These gelled byproducts are oligomers or polymers formed during the reaction of sorbic acid and triethylene glycol that remain undissolved in the reaction mixture. The molecular weights of these byproducts can be determined by self-diffusion coefficient measurements using Pulse Field Gradient NMR spectroscopy. Preferably the concentration of gelled byproduct is less than 2, more preferably less than 1, more preferably less than 0.1, and most preferably 0 weight percent, based on the weight percent of the disorbate ester.

As the following examples demonstrate, the process of the present invention results in a much more improved profile for triethylene glycol disorbate.

EXAMPLES

Example 1—Preparation of a High Purity Triethylene Glycol Disorbate With Sulfuric Acid Catalyst To a 500-mL 3-neck flask equipped with a Dean-Stark apparatus was added sorbic acid (133 g), triethylene glycol (75 g) and toluene (220 g). The flask was heated to 80° C. with stirring until all the acid was dissolved. Concentrated sulfuric acid (2.66 g) premixed with toluene (26.6 g) was added drop-wise to the flask followed by the addition of BHT (5000 ppm). The flask was heated to 155° C. (corresponding to an internal temperature of 120 to 130° C.) for 385 min, at which time no additional water was observed to condense in the Dean-Stark apparatus from the toluene/water heterogeneous azeotrope. The w/w ratio of the resultant disorbate to monosorbate was 86:2.2, corresponding to 97.5% by weight of the desired disorbate and 2.5% by weight of the monosorbate.

Comparative Example 1—Preparation of Triethylene Glycol Disorbate With Toluene Sulfonic Acid Catalyst The reaction was carried out using substantially the same procedure described in Example 1 except that the reaction was carried out over 540 min and neat toluene sulfonic acid was used instead of 10% sulfuric acid in toluene. The w/w ratio of the resultant disorbate to monosorbate was 73.3:14.6, corresponding to 83.4% by weight of the desired disorbate and 16.6% by weight of the monosorbate.

Examples 2 and 3 and Comparative Examples 2 and 3 (C2 and C3) were carried out substantially as described in Example 1 except as shown in Table 1. SA refers to sorbic acid, TEG refers to triethylene glycol, and TsOH refers to toluene sulfonic acid. Temp refers to the temperature of the flask, not the internal contents. The amount of toluene listed in the table for Examples 2 and 3 does not include toluene that is added with the sulfuric acid. No additional solvent was used to dilute TsOH.

TABLE 1

Process Conditions for Examples and Comparatives

| Ex. No. | SA (g) | TEG (g) | TsOH (g) | $H_2SO_4$ (g) | Toluene (g) | Temp ° C. | Time (min) |
|---|---|---|---|---|---|---|---|
| C1 | 133 | 75 | 2.66 | 0 | 220 | 155 | 540 |
| C2 | 133 | 75 | 2.66 | 0 | 200 | 155 | 720 |
| C3 | 133 | 75 | 2.66 | 0 | 130 | 155 | 420 |
| 1 | 133 | 75 | 0 | 2.66 | 220 | 155 | 385 |
| 2 | 112 | 75 | 0 | 2.30 | 200 | 155 | 444 |
| 3 | 133 | 75 | 0 | 3.36 | 200 | 170 | 197 |

Table 2 illustrates the distribution of the disorbate and monosorbate products and gel formation. % Disorbate and % Monosorbate refer to the percent of disorbate and monosorbate with respect to the sum of the disorbate and the monosorbate. These amounts were not measured (NM) where gelation occurred.

TABLE 2

Distribution of Products

| Ex. No. | Gel? | % Monosorbate | % Disorbate |
|---|---|---|---|
| C1 | N | 16.6 | 83.4 |
| C2 | Y | NM | NM |
| C3 | Y | NM | NM |
| 1 | N | 2.5 | 97.5 |
| 2 | N | 2.1 | 97.9 |
| 3 | N | 3.4 | 96.6 |

The results show that using sulfuric acid as a catalyst makes a dramatic difference in obtaining high purity disorbate and little or no formation of gel.

What is claimed is:

1. A composition comprising triethylene glycol disorbate and triethylene glycol monosorbate, wherein the weight:weight ratio of the disorbate to the monosorbate is from 19:1 to 99:1.

2. The composition of claim 1 wherein the weight:weight ratio of the disorbate to the monosorbate is from 19:1 to 65.6:1.

3. The composition of claim 1 wherein the weight:weight ratio of the disorbate to the monosorbate is from 24:1 to 99:1.

4. The composition of claim 1 wherein the weight:weight ratio of the disorbate to the monosorbate is from 24:1 to 65.6:1.

5. The composition of claim 1 wherein the weight:weight ratio of the disorbate to the monosorbate is from 32:1 to 99:1.

6. The composition of claim 1 wherein the weight:weight ratio of the disorbate to the monosorbate is from 32:1 to 65.7:1.

7. The composition of claim 1 wherein the weight:weight ratio of the disorbate to the monosorbate is from 39:1 to 99:1.

8. The composition of claim 1 wherein the weight:weight ratio of the disorbate to the monosorbate is from 39:1 to 65.7:1.

9. The composition of claim 4 which composition further comprises less than 1 weight percent gelled byproducts having a molecular weight of greater than 5000 Daltons, as determined by self-diffusion coefficient measurements using Pulse Field Gradient NMR spectroscopy.

10. The composition of claim 6 which composition further comprises less than 0.1 weight percent gelled byproducts having a molecular weight of greater than 5000 Daltons, as determined by self-diffusion coefficient measurements using Pulse Field Gradient NMR spectroscopy.

* * * * *